UNITED STATES PATENT OFFICE

OTTO ALLEMANN, OF WILMINGTON, DELAWARE, ASSIGNOR TO E. I. DU PONT DE NEMOURS & COMPANY, OF WILMINGTON, DELAWARE, A CORPORATION OF DELAWARE

DYE OF THE NAPHTHO-PHENAZINE SERIES AND PROCESS OF MAKING IT

No Drawing. Application filed August 15, 1930. Serial No. 475,631.

This invention relates generally to organic compounds and specifically to compounds or dyes of the naphtho-phenazine series. More particularly it relates to new iso-rosindulines and new rosinduline compounds.

In the matter of prior art attention may be directed to German Patents 19,224 and 40,886, which disclose the preparation of iso-rosindulines from the paranitroso derivatives of tertiary amines. In addition, German Patents 97,118 and 97,365 describe the preparation of rosindulines from iso-rosindulines such as Neutral blue.

This invention has for an object the production of new organic compounds. More specifically the invention contemplates the preparation of a new series of iso-rosindulines and a new series of rosindulines. Other objects will appear hereinafter.

These objects are accomplished by the present invention whereby compounds of the following probable general formulæ are produced:

*I*

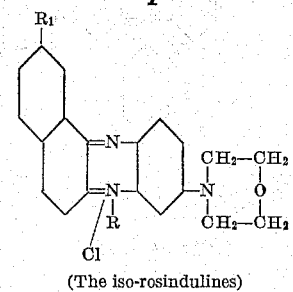

(The iso-rosindulines)

*II*

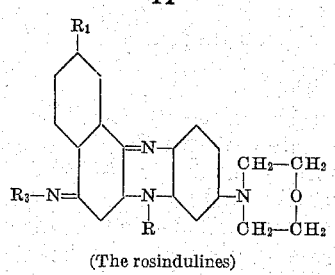

(The rosindulines)

in which R represents an alkyl or aryl group which may be substituted, $R_1$ represents H or

$R_2$ represents an alkyl or aryl group which may be substituted and $R_3$ represents H, an alkyl or aryl radical in which the alkyl or aryl may be substituted.

Such compounds may be produced by the reactions indicated by the following equations:

*Ia*

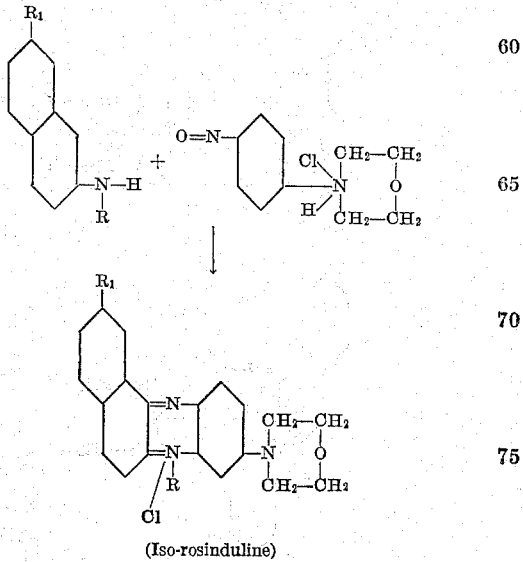

(Iso-rosinduline)

*IIa*

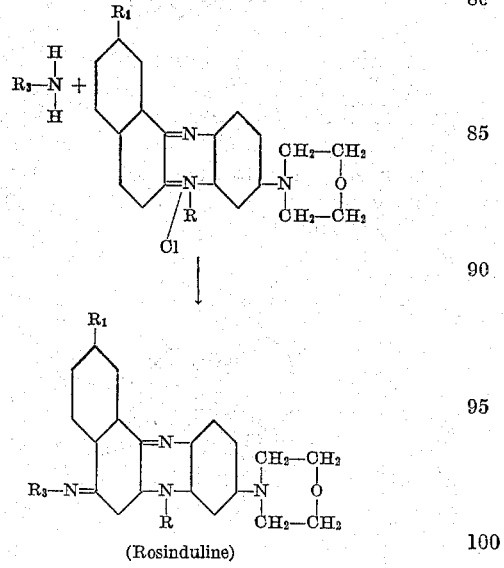

(Rosinduline)

The invention will be further understood from a consideration of the following examples in which the parts are given by weight.

PART I—ISO-ROSINDULINES

Example I

A mixture of 22 parts of phenyl-beta-naphthylamine 45 parts of nitroso-phenyl-morpholine hydrochloride and 150 parts of methyl alcohol was heated to the boiling point under a reflux condenser for four hours. The methyl alcohol was then distilled off and from the residue the dye extracted with boiling water. Salt was added to the solution until the dye was completely salted out. The new dye dyes cotton a blue shade.

The reaction utilized probably takes place according to the following equation

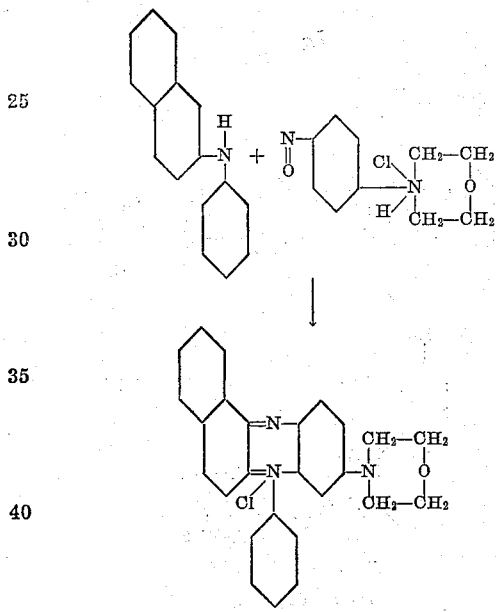

Example II

A mixture of 25 parts of para-tolyl-beta-naphthylamine 45 parts of nitroso-phenyl-morpholine hydrochloride and 150 parts of methyl alcohol was treated the same way as indicated in Example I. The dye dyes cotton a blue shade. The dye has the following probable formula

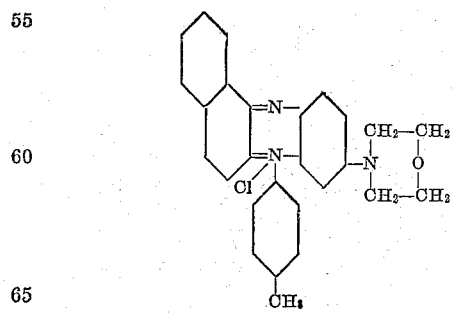

Example III

A mixture of 17.5 parts of ethyl-beta-naphthylamine 45.0 parts of nitroso-phenyl-morpholine hydrochloride and 150.0 parts of methyl alcohol was heated and the dye isolated according to directions in Example I. It dyes cotton a violet shade. The dye has the following probable formula

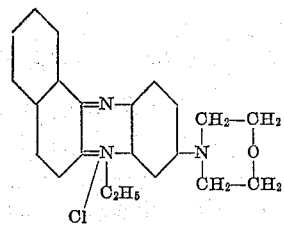

Example IV

A mixture of 16 parts of diphenyl-2:7-naphthylene-diamine 22 parts of nitroso-phenyl-morpholine hydrochloride and 150 parts of methyl alcohol was heated and the dye extracted as in Example I. The new dye dyes cotton a reddish-blue and has good affinity for acetyl silk. The dye has the following probable formula

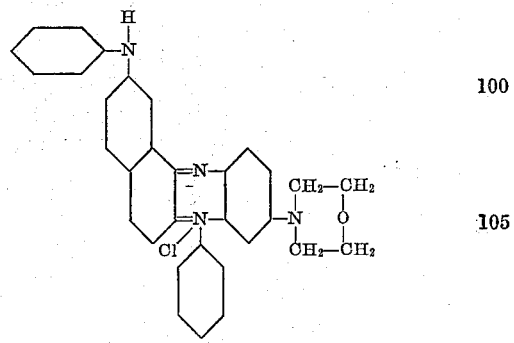

PART II—ROSINDULINES

Example V

A mixture of 19 parts of an iso-rosinduline (from nitroso-phenyl-morpholine + ethyl-beta-naphthylamine) and 16 parts of meta-toluylene-diamine were dissolved in 150 parts of ethyl alcohol. 10 parts of caustic soda solution (35%) were then added and the oxidation effected by passing a current of air through the solution at 40-45° C. The reaction was finished when a drop of the solution dissolved in concentrated sulphuric acid with a grass green color. The alcohol was then distilled off and from the residue the dye extracted with hot dilute hydrochloric acid. From this solution the new rosinduline was salted out with salt. It dyed cotton a reddish-violet shade. The reaction probably takes place according to the following equation

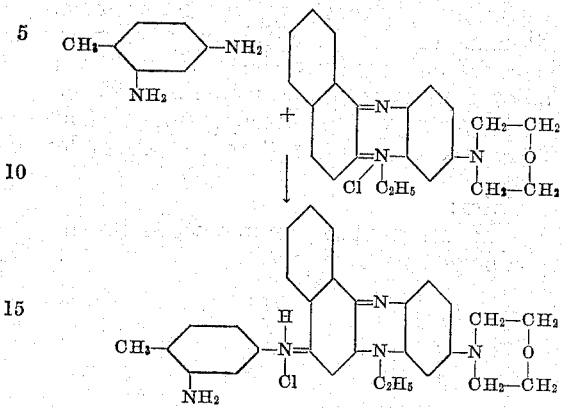

Example VI

A mixture of 22 parts of an iso-rosinduline (from nitroso-phenyl-morpholine and para-tolyl-beta-naphthylamine), and 12 parts of para-amido-diphenylamine were dissolved in 200 parts of ethyl alcohol. 12 parts of caustic soda solution (35%) were then added and a current of air passed through the solution at 40–45° C., until a drop of the solution dissolved in concentrated sulphuric acid with a green color. The rosinduline was filtered off and dried. Through sulphonation it can be converted into an acid dye which dyes wool a blue shade. The compound produced probably has the following formula

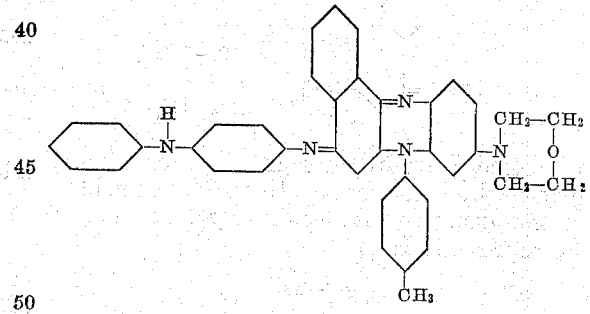

Example VII

A mixture of 25 parts of an iso-rosinduline (from nitroso-phenyl-morpholine and diphenyl-2:7-naphthylene-diamine), and 10 parts of aniline were dissolved in 150 parts of ethyl alcohol. 12 parts of caustic soda solution (35%) were then added and a current of air passed through the solution at 45–50° C., until a drop of the solution dissolved in concentrated sulphuric acid with a green color. The rosinduline was then filtered off and dried. It may be sulphonated to an acid dye which dyes wool a blue shade.

The compound produced probably has the following formula

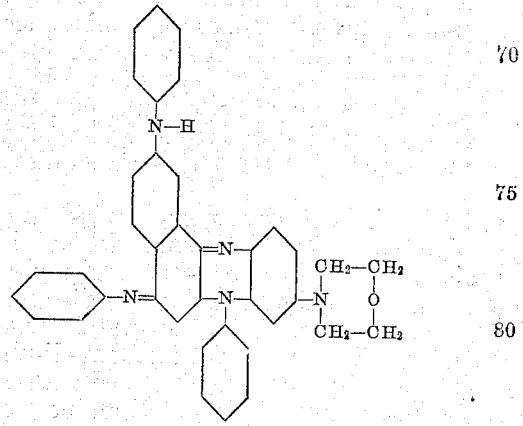

Example VIII

A mixture of 22 parts of an iso-rosinduline (from nitroso-phenyl-morpholine+para-ethoxy-phenyl-beta-naphthylamine), and 10 parts of para-amino-dimethylaniline were dissolved in 150 parts of ethyl alcohol. 12 parts of caustic soda solution (35%) were then added and oxidation carried out by passing a current of air through the solution at 35–40° C., until a drop dissolved with green color in concentrated sulphuric acid. The rosinduline was filtered off and dissolved in hot dilute hydrochloric acid. From this solution the dye was salted out with salt. It dyed cotton a violet shade. The compound produced probably has the following formula

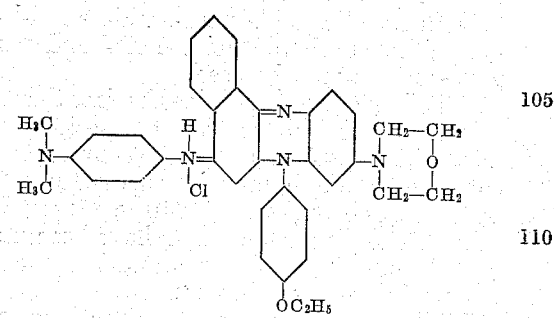

Various modifications may be made within the scope of the invention.

Other solvents may replace the methyl alcohol used in the preparation of iso-rosindulines as set out above, for example, ethyl alcohol or acetic acid give satisfactory results.

The number of compounds which are obviously adapted to yield dyes of both of the classes herein described is very large and consequently it is impractical to attempt to list them all.

Certain compounds merit special mention, however, for instance in the preparation of the iso-rosindulines in place of the phenyl-beta-naphthylamine (Example I), para-tolyl-beta-naphthylamine (Example II), and ethyl-beta-naphthylamine (Example III), the following may be used with very desirable results: ortho-tolyl-beta-naphthylamine, xylyl-beta-naphthylamine, methyl-beta-naphthylamine, butyl-beta-naphthylamine, para-methoxy-phenyl-beta-naphthylamine, para-ethoxy-phenyl-beta-naphthylamine, ortho-methoxy-phenyl-beta-naphthylamine, ortho-ethoxy-phenyl-beta-naphthylamine.

Especially satisfactory results are obtained from the compounds formed by replacing the di-phenyl-2:7-naphthylene-diamine of Example IV with di-tolyl-2:7-naphthylene di-amine, di-xylyl-2:7-naphthylene di-amine, para-methoxy-di-phenyl-2:7-naphthylene di-amine, para-ethoxy-di-phenyl-2:7 naphthylene di-amine, ortho-methoxy-diphenyl-2:7-naphthylene di-amine, ortho-ethoxy-di-phenyl-2:7-naphthylene di-amine, or the corresponding derivatives of 2:6 naphthylene di-amine.

In the preparation of the rosindulines, in the place of meta-toluylene-di-amine (Example V), para-amido-di-phenylamine (Example VI), aniline (Example VII), and para-amido-di-methyl-aniline (Example VIII), the following may be used with excellent results: toluidine, xylidine, meta-phenylene-di-amine, para-amido-methyl-ethyl-aniline, para-amido-di-ethyl-aniline, para-amido-phenyl-morpholine, para-amido-methyl-benzyl-aniline, para-amido-ethyl-benzyl-aniline.

Also the nitrated and sulphonated derivatives of primary amines such as sulphanilic acid, metanilic acid, para-amido-ethyl-benzyl-aniline-sulphonic acid, meta- and para-nitro-aniline may be used.

It is desired to emphasize the fact that applicant in the above list of specific compounds has not attempted to enumerate all compounds which may be successfully utilized in this invention. On the contrary, certain outstanding compounds have been mentioned for purposes of illustrating the invention and without intent to limit it.

While certain reactions, equations and theories have been set out above to aid in understanding the invention it is to be understood that it is not desired to limit the invention thereby.

The iso-rosinduline compounds made according to the above described invention are suitable for dyeing cotton and acetyl silk.

The rosinduline compounds produced as above described are suitable for dyeing silk, cotton, acetyl silk and wool.

The new iso-rosinduline dyes of this invention differ in shades from the known dyes of this class.

The new rosinduline dyes differ in shade from those prepared with iso-rosindulines obtained from para-nitroso derivatives of di-methyl-aniline, methyl-ethyl-aniline, and di-ethyl aniline in that they are somewhat redder and when used as basic dyes have more affinity for acetyl silk.

As many apparently widely different embodiments of this invention may be made without departing from the spirit and scope thereof, it is to be understood that I do not limit myself to the specific embodiments thereof except as defined in the appended claims.

I claim:

1. The compounds having the following probable general formula

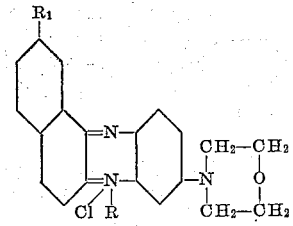

in which R represents an alkyl or phenyl group which may be substituted by a radical of the group consisting of alkyl and alkoxy, $R_1$ represents H or

and $R_2$ represents an alkyl or phenyl group which may be substituted by a radical of the group consisting of alkyl and alkoxy.

2. The compound having the following probable general formula

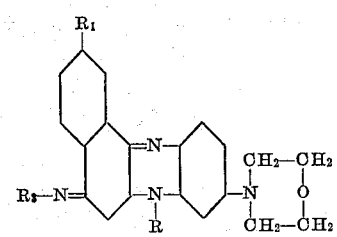

in which R represents an alkyl or phenyl group which may be substituted by a member of the group consisting of alkyl and alkoxy, $R_1$ represents H or

$R_2$ represents an alkyl or phenyl group which may be substituted by a member of the group consisting of alkyl and alkoxy and $R_3$ represents H, an alkyl or phenyl group in which the phenyl group may be substituted by a member of the group consisting of alkyl and alkoxy.

3. A naphtho-phenazine compound having morpholine as a substituent in the 3 position.

4. An iso-rosinduline compound containing the morpholine nucleus in the 3 position.

5. A rosinduline compound containing a morpholine nucleus in the 3 position.

6. A basic iso-rosinduline dye containing a morpholine radical in the 3 position.

7. An acid iso-rosinduline dye containing a morpholine radical in the 3 position.

8. A basic rosinduline dye containing a morpholine nucleus in the 3 position.

9. An acid rosinduline dye containing a morpholine nucleus in the 3 position.

10. The process comprising condensing an iso-rosinduline compound containing a morpholine nucleus in the 3 position with a primary amine.

11. The process comprising condensing para-nitroso-phenyl-morpholine hydrochloride with a secondary derivative of beta-naphthylamine of the group consisting of alkyl, phenyl, alkyl-phenyl and alkoxy-phenyl.

12. The process comprising condensing para-nitroso-phenyl-morpholine hydrochloride with a secondary derivative of beta-naphthylamine of the group consisting of methyl, ethyl, butyl, phenyl, tolyl, xylyl, anisidyl and phenetidyl.

13. The dye having the probable formula

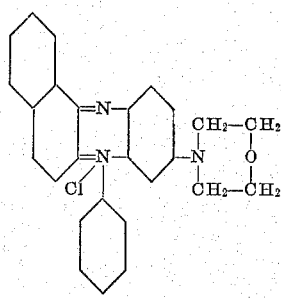

which is obtainable by reacting phenyl-beta-naphthylamine and nitroso-phenyl-morpholine-hydrochloride and which dyes cotton a blue shade.

14. The dye having the probable formula

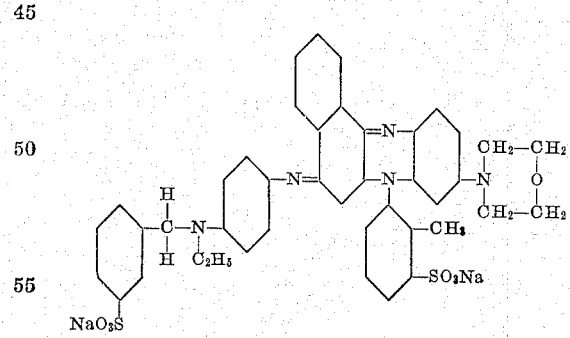

which is obtainable by reacting ortho-tolyl-beta-naphthylamine with nitroso-phenyl-morpholine-hydrochloride, reacting the resultant with para-amido-ethyl-benzyl-aniline and sulphonating the product and which dyes wool blue shades of good fastness.

15. The process which comprises condensing para-nitroso-phenyl-morpholine-hydrochloride with a compound having the following general formula:

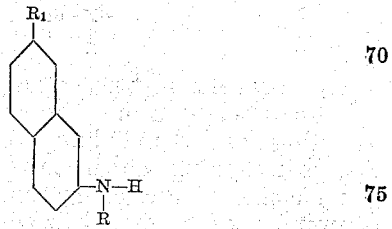

in which R represents an alkyl or phenyl group which may be substituted by a member of the group consisting of alkyl and alkoxy, $R_1$ represents H or

$R_2$ represents a phenyl group which may be substituted by a member of the group consisting of alkyl and alkoxy.

16. The process which comprises reacting a compound having the following general formula:

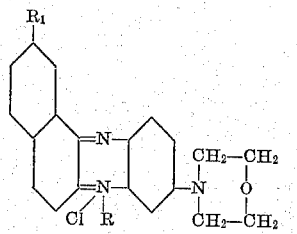

with a compound having the following general formula:

in which R represents an alkyl or phenyl group which may be substituted by a member of the group consisting of alkyl and alkoxy, $R_1$ represents H or

$R_2$ represents a phenyl group which may be substituted by a member of the group consisting of alkyl and alkoxy, and $R_3$ represents a phenyl group which may be substituted by a member of the group consisting of alkyl, amino, alkyl-amino, nitro, sulfo, and morpholine.

17. The compound having the following general formula:

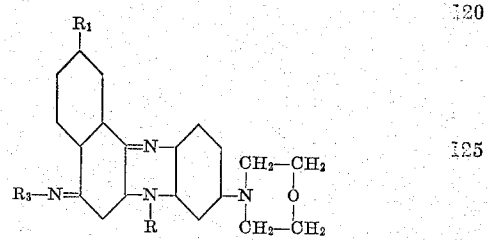

in which R represents an alkyl or phenyl group which may be susbstituted by a member of the group consisting of alkyl and alkoxy, $R_1$ represents H or

$R_2$ represents a phenyl group which may be substituted by a member of the group consisting of alkyl and alkoxy, and $R_3$ represents a phenyl group which may be substituted by a member of the group consisting of alkyl, amino, alkyl-amino, nitro, sulfo, and morpholine.

In testimony whereof, I affix my signature.

OTTO ALLEMANN.